(12) United States Patent
Chang et al.

(10) Patent No.: US 6,921,803 B2
(45) Date of Patent: Jul. 26, 2005

(54) POLY(TRIMETHYLENE TEREPHTHALATE) FIBERS, THEIR MANUFACTURE AND USE

(75) Inventors: Jing C. Chang, Boothwyn, PA (US); Joseph V. Kurian, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 378 days.

(21) Appl. No.: 10/193,498

(22) Filed: Jul. 11, 2002

(65) Prior Publication Data

US 2004/0009352 A1 Jan. 15, 2004

(51) Int. Cl.[7] .............................................. C08G 63/00
(52) U.S. Cl. ............................ 528/308.7; 528/308.6; 264/103; 264/210.8; 264/211.12; 264/342 RE; 57/282
(58) Field of Search .............................. 264/176.1, 103, 264/211, 211.12, 342 RE, 210.8; 57/282; 528/308, 308.6, 308.7

(56) References Cited

U.S. PATENT DOCUMENTS

| | | | |
|---|---|---|---|
| 3,718,534 A | | 2/1973 | Okamoto et al. |
| 3,984,600 A | * | 10/1976 | Kawase et al. ............. 428/364 |
| 4,131,595 A | | 12/1978 | Breitenfellner et al. |
| 4,167,541 A | | 9/1979 | Alexander |
| 4,307,565 A | | 12/1981 | Sasaki et al. |
| 4,410,473 A | | 10/1983 | Iohara et al. |
| 4,442,057 A | | 4/1984 | Brody |
| 4,454,196 A | | 6/1984 | Iohara et al. |
| 4,475,330 A | | 10/1984 | Kimura et al. |
| 4,518,744 A | | 5/1985 | Brody |
| 4,609,710 A | | 9/1986 | Iohara et al. |
| 5,340,909 A | | 8/1994 | Doerr et al. |
| 5,645,782 A | | 7/1997 | Howell et al. |
| 5,782,935 A | | 7/1998 | Hirt et al. |
| 5,906,877 A | * | 5/1999 | Popper et al. ............... 428/92 |
| 5,962,131 A | | 10/1999 | Schwinde et al. |
| 5,993,712 A | | 11/1999 | Wandel et al. |
| 6,214,264 B1 | | 4/2001 | Aneja |
| 6,231,976 B1 | * | 5/2001 | Dean et al. ................. 428/373 |
| 6,235,389 B1 | | 5/2001 | Schwarz et al. |
| 6,245,844 B1 | | 6/2001 | Kurian et al. |
| 6,287,688 B1 | | 9/2001 | Howell et al. |
| 6,312,805 B1 | | 11/2001 | Sun |
| 6,333,106 B2 | | 12/2001 | Howell et al. |
| 6,334,877 B1 | * | 1/2002 | Studholme ................. 8/115.56 |
| 2001/0030371 A1 | | 10/2001 | Howell et al. |
| 2001/0030377 A1 | | 10/2001 | Howell et al. |
| 2001/0033929 A1 | | 10/2001 | Howell et al. |
| 2002/0014718 A1 | | 2/2002 | Klein et al. |
| 2002/0017735 A1 | | 2/2002 | Schwind et al. |
| 2002/0025433 A1 | | 2/2002 | Chang et al. |
| 2002/0051880 A1 | * | 5/2002 | Smith et al. ................. 428/364 |
| 2002/0187698 A1 | * | 12/2002 | Mizumura et al. .......... 442/195 |
| 2003/0186051 A1 | * | 10/2003 | Figuly et al. ............... 428/373 |
| 2003/0187140 A1 | * | 10/2003 | Lintecum et al. ........... 525/178 |

FOREIGN PATENT DOCUMENTS

| | | |
|---|---|---|
| EP | 154425 | 11/1985 |
| EP | 1167594 | 2/2002 |
| JP | 56-91013 | 7/1981 |
| JP | 57-61716 | 4/1982 |
| JP | 57-193536 | 11/1982 |
| JP | 62-021817 | 1/1987 |
| JP | 6-345923 | 12/1994 |
| JP | 11-189925 | 7/1999 |
| JP | 11-286596 | 10/1999 |
| KR | 051331 | 9/1998 |
| WO | WO 01/34693 | 5/2001 |
| WO | WO 02/22925 | 3/2002 |
| WO | WO 02/22927 | 3/2002 |

OTHER PUBLICATIONS

English Translation of Japanese Patent Abstract (Pub. No. 62–021817).
International Search Report, date of mailing Sep. 11, 2003.

* cited by examiner

*Primary Examiner*—Mark A. Osele
(74) *Attorney, Agent, or Firm*—Mark D. Kuller

(57) ABSTRACT

A process for preparing poly(trimethylene terephthalate) fibers comprising (a) providing a poly(trimethylene terephthalate) composition comprising about 0.05 to about 5 mole % tetramethylene terephthalate repeat units and (b) spinning the polymer composition to form fibers. Poly (trimethylene terephthalate) fiber comprising poly (trimethylene terephthalate) composition comprising about 0.05 to about 5 mole % tetramethylene terephthalate repeat units, as well as yarns, fabrics (e.g., woven, knitted, and nonwoven fabrics) and carpets. A poly(trimethylene terephthalate) composition comprising about 0.05 to about 5 mole % tetramethylene terephthalate repeat units.

26 Claims, No Drawings

POLY(TRIMETHYLENE TEREPHTHALATE) FIBERS, THEIR MANUFACTURE AND USE

FIELD OF THE INVENTION

This invention relates to a process for spinning poly(trimethylene terephthalate) fibers, the resultant fibers, and their use.

BACKGROUND OF THE INVENTION

Poly(trimethylene terephthalate) (also referred to as "3GT" or "PTT") has recently received much attention as a polymer for use in textiles, flooring, packaging and other end uses. Textile and flooring fibers have excellent physical and chemical properties.

Textured polyester yarns, prepared from partially oriented polyester yarns or spun drawn yarns, are used in many textile applications, such as knit and woven fabrics (e.g., as the yarn for the entire fabric, the warp, weft or fill, or as one of two or more yarns in a blend, for instance, with cotton, wool, rayon, acetate, other polyesters, spandex and/or combinations thereof, etc.) for apparel and upholstery (e.g., furniture and automotive). Poly(ethylene terephthalate) textured yarns are commonly used for this purpose. Howell et al., in U.S. Pat. No. 6,287,688, which is incorporated herein by reference, have described preparing textured poly(trimethylene terephthalate) yarns and their benefits. The resultant yarns have increased stretch, luxurious bulk and improved hand, as compared to poly(ethylene terephthalate) yarns. Howell et al. describe preparing stable partially oriented poly(trimethylene terephthalate) yarns in a process with a spinning speed of up to 2600 meters per minute ("m/m"), and it has been desired to spin at higher rates.

Preparing stable partially oriented poly(trimethylene terephthalate) yarns at high speeds using poly(ethylene terephthalate) conditions has not worked well. After spinning, a partially oriented yarn is typically wound onto a tube, or package, and the yarn packages are then stored or sold for use as a feed yarn in later processing operations such as drawing or draw-texturing. A partially oriented yarn package is not useable in subsequent drawing or draw-texturing processes if the yarn or the package itself are damaged due to aging of the yarns or other damage caused during warehousing or transportation of the yarn package.

Stable partially oriented poly(ethylene terephthalate) yarns are typically spun at speeds of about 3,500 yards per minute ("ypm") (3,200 m/m). Since they typically do not age very rapidly, they remain suitable for downstream drawing or draw-texturing operations. In the past, attempts to make stable partially oriented poly(trimethylene terephthalate) yarns using a spinning speed in this same range have failed. The resulting partially oriented poly(trimethylene terephthalate) yarns have been found to contract up to about 25% as they crystallize with aging over time. In extreme case, the contraction is so great that the tube is physically damaged by the contraction forces of the yarn. In more common cases, the contraction renders the partially oriented poly(trimethylene terephthalate) yarns unfit for use in drawing or draw-texturing operations. In such cases, the package becomes so tightly wound that the yarn easily breaks as it is unwound from the package.

Spinning partially oriented poly(trimethylene terephthalate) yarns at slower speeds using equipment originally designed for partially oriented poly(ethylene terephthalate) yarns is inefficient. It is also problematic since the spinning and winding equipment is designed to run at higher speeds than those presently used for making poly(trimethylene terephthalate) yarns.

Spun drawn yarns are also used to make textured yarns, and there is also a desire to prepare spun drawn yarns at higher speeds.

It is also very desirable that the practitioner be able to make textured poly(trimethylene terephthalate) yarns from partially oriented and spun drawn poly(trimethylene terephthalate) yarns prepared at high speeds using the same or similar conditions to those produced at lower speeds. Thus, these yarns should have the same or similar elongations and tenacities.

Poly(trimethylene terephthalate) filaments and yarns have also been prepared for other purposes. For instance, bulked continuous filament (BCF) yarns, their manufacture, and their use in flooring, are described in U.S. Pat. Nos. 5,645,782, 5,662,980, and 6,242,091, which are hereby incorporated by reference. Fine denier yarns are described in U.S. Patent Publication Nos. 2001/30377 A1 and 2001/53442 A1, which are incorporated herein by reference, and direct use yarns are described in U.S. Patent Publication No. 2001/33929 A1, which is incorporated herein by reference. Staple fibers can be made from multifilament yarns as described in WO 02/22925 and WO 02/22927, which are incorporated by reference. Spinning these yarns, as well as other poly(trimethylene terephthalate) yarns and filaments, at higher speeds can be advantageous. Therefore, the ability to spin poly(trimethylene terephthalate) yarns and fibers at higher speeds is desired. It is also desired that the practitioner be able to use the resultant yarns under the same conditions as yarns prepared at slower speeds.

Use of various additives to obtain benefits in spinning or other processing steps has been described in many patents. For instance, U.S. Pat. No. 4,475,330, which is incorporated herein by reference, discloses a high twist polyester multifilament yarn made from polyester filaments consisting essentially of (a) a copolymer of two or more monomers selected from the group consisting of ethylene terephthalate, trimethylene terephthalate and tetramethylene terephthalate, and/or (b) a blend of two or more polymers of ethylene terephthalate, trimethylene terephthalate and tetramethylene terephthalate. The patent states that a woven or knitted crepe fabric obtained by employing such a high twist yarn has a desirable pebble configuration. The preferred polyester is comprised of 20% to 90% by weight of ethylene terephthalate units, and 80% to 10% by weight of trimethylene units and/or tetramethylene units. Examples 1, 2, 4 and 5 show blends of 95 to 10 weight % poly(ethylene terephthalate) and 5 to 90 weight % poly(tetramethylene terephthalate). Example 6 describes compositions comprising 95 to 10 weight % poly(ethylene terephthalate) and 5 to 90 weight % poly(trimethylene terephthalate). This patent describes use of 3 to 15% of non-crystalline polymer, preferably styrene polymers or methacrylate polymers, to impart higher twist setting ability. Example 7 shows use of polystyrene with poly(ethylene terephthalate), poly(tetramethylene terephthalate), and blends thereof. The examples also show blends comprising 50 weight % poly(ethylene terephthalate), 25 weight % poly(tetramethylene terephthalate) and 25 weight % poly(trimethylene terephthalate).

U.S. Pat. Nos. 4,454,196 and 4,410,473, which are incorporated herein by reference, describe a polyester multifilament yarn consisting essentially of filament groups (I) and (II). Filament group (I) is composed of polyester selected from the group poly(ethylene terephthalate), poly (trimethylene terephthalate) and poly(tetramethylene terephthalate), and/or a blend and/or copolymer comprising at least two members selected from these polyesters. Filament group (II) is composed of a substrate composed of (a) a polyester selected from the group poly(ethylene terephthalate), poly(trimethylene terephthalate) and poly(tetramethylene terephthalate), and/or a blend and/or copolymer comprising at least two members selected from these polyesters, and (b) 0.4 to 8 weight % of at least one polymer selected from the group consisting of styrene type polymers, methacrylate type polymers and acrylate type polymers. The filaments can be extruded from different spinnerets, but are preferably extruded from the same spinneret. It is preferred that the filaments be blended and then interlaced so as to intermingle them, and then subjected to drawing or draw-texturing. Example 1 shows preparation of filaments of type (II) from poly(ethylene terephthalate) and polymethylmethacrylate. Example 3 shows preparation of type (I) filaments from 70 weight % poly(ethylene terephthalate) and 30 weight % polystyrene in an amount of 1 to 6 weight %. Poly(trimethylene terephthalate) was not used in the examples.

Some patent documents that describe poly(trimethylene terephthalate) mention that copolymers, including copolyesters, can be prepared. For instance, U.S. 2001/33929A1, which is incorporated herein by reference, states that poly(trimethylene terephthalate) can contain other repeating units, typically in the range of about 0.5 to about 15 mole %. Many examples are given, including diols having 2 to 8 carbon atoms such as 1,4-butanediol.

It is desired to increase productivity in the manufacture of poly(trimethylene terephthalate) yarns, particularly partially oriented yarns, spun drawn yarns, and bulked continuous filament yarns, and in the manufacture of staple fibers, by using a high speed spinning process, without deterioration of the filament and yarn properties. It is further desired for these yarns to be useful in preparing products, such as textured yarns, fabrics and carpets, under the same or similar conditions to those used for poly(trimethylene terephthalate) yarns prepared at slower speeds.

SUMMARY OF THE INVENTION

This invention is directed to a process for preparing poly(trimethylene terephthalate) fibers comprising (a) providing a poly(trimethylene terephthalate) composition comprising about 0.05 to about 5 mole % tetramethylene terephthalate repeat units, and (b) spinning the polymer composition to form fibers.

Tetramethylene terephthalate repeat units are present in the poly(trimethylene terephthalate) composition in an amount of at least about 0.05 mole %, preferably at least about 0.1 mole %, more preferably at least about 0.5 mole %, even more preferably at least about 0.6 mole %, even more preferably at least about 0.75 mole %, even more preferably at least about 0.9 mole %, even more preferably at least about 1 mole %, even more preferably greater than 1 mole %, even more preferably at least about 1 mole %, even more preferably at least about 1.5 mole %, and most preferably greater than 1.5 mole %. Tetramethylene terephthalate repeat units are present in an amount of up to about 5 mole %, preferably less than 5 mole %, more preferably up to 4.5 mole %, even more preferably less than 4 mole %, even more preferably up to about 3 mole %, even more preferably less than 3 mole %, most preferably up to about 2.5 mole %. Most preferred is about 2 mole % of poly(tetramethylene terephthalate). They can be present in poly(tetramethylene terephthalate) copolyester and/or poly(trimethylene terephthalate) resulting from transesterification or added as copolyester.

In many instances, the polymer blend will be prepared from poly(tetramethylene terephthalate) homopolymers or polymers that only contain minor amounts of other repeat units. In that instance reference to poly(tetramethylene terephthalate) being added in an amount of at least about 0.05 to about 5 mole %, with the preferences indicated above, is appropriate.

In many instances, the trimethylene terephthalate repeat units will be the only other or substantially all of the other polymer repeat units. Similarly, the polymer blend will frequently be prepared from poly(trimethylene terephthalate) homopolymers or polymers that only contain minor amounts of other repeat units. Thus, reference can be made to the trimethylene terephthalate units or poly(trimethylene terephthalate) being present in amounts corresponding to those listed above for the tetramethylene terephthalate units and poly(tetramethylene terephthalate).

Thus, in a preferred embodiment, the poly(trimethylene terephthalate) composition comprises about 95 to about 99.95 mole % of the trimethylene terephthalate units and about 5 to about 0.05 mole % of the tetramethylene terephthalate repeat units.

In a preferred embodiment, the poly(trimethylene terephthalate) composition comprises poly(trimethylene terephthalate) and about 0.05 to about 5 mole % poly(tetramethylene terephthalate). For instance, the poly(trimethylene terephthalate) composition comprises about 97.5 to about 99 mole % of poly(trimethylene terephthalate) and about 2.5 to about 1 mole % of poly(tetramethylene terephthalate).

In another preferred embodiment, the poly(trimethylene terephthalate) composition comprises a poly(trimethylene terephthalate) copolyester containing about 0.05 to about 5 mole % tetramethylene terephthalate repeat units.

The poly(trimethylene terephthalate) composition can contain other polymer, copolymers, etc., as described below. Therefore, in a preferred embodiment, the poly(trimethylene terephthalate) composition comprises about 70 to about 99.95 mole % of the poly(trimethylene terephthalate), about 5 to about 0.05 mole % of the tetramethylene terephthalate repeat units, and, optionally, up to 29.95 mole % of other polymeric units.

In a preferred embodiment, the poly(trimethylene terephthalate) composition further comprises styrene polymer. Preferably the styrene polymer is selected from the group consisting of polystyrene, alkyl or aryl substituted polystyrenes and styrene multicomponent polymers, most preferably polystyrene.

Preferably the poly(trimethylene terephthalate) composition further comprises at least one selected from the group consisting of hexamethylene diamine, polyamides, delusterants, nucleating agents, heat stabilizers, viscosity boosters, optical brighteners, pigments, and antioxidants.

In a preferred embodiment, the fibers are in the form of multifilament yarn. In a preferred embodiment, the multifilament yarn is partially oriented yarn and the spinning comprises extruding the poly(trimethylene terephthalate) composition through a spinneret at a spinning speed of at least about 3,000 m/m. In another preferred embodiment, the multifilament yarn is partially oriented yarn comprised of about 0.5 to about 2.5 dpf filaments and is spun at a spinning speed of at least about 2,500 m/m. These processes preferably comprises interlacing and winding the filaments. In yet another preferred embodiment, the invention is directed to a poly(trimethylene terephthalate) multifilament textured yarn comprising poly(trimethylene terephthalate) multiconstituent filaments, prepared by (a) preparing a package of partially oriented poly(trimethylene terephthalate) multifilament yarn, (b) unwinding the yarn from the package, (c) drawing the multiconstituent filaments yarn to form a drawn yarn, (d) false-twist texturing the drawn yarn to form the textured yarn, and (e) winding the yarn onto a package.

In a preferred embodiment, the multifilament yarn is spun drawn yarn and the processing comprises drawing the filaments at a draw speed, as measured at the roller at the end of the draw step, of about 2,000 to about 8,000 meters/minute. The processing of the multiconstituent filaments into spun drawn poly(trimethylene terephthalate) multifilament yarn preferably comprises drawing, annealing, interlacing and winding the filaments. The invention is also directed to a process for preparing poly(trimethylene terephthalate) multifilament textured yarn comprising poly(trimethylene terephthalate) multiconstituent filaments, comprising (a) preparing a package of spun drawn poly(trimethylene terephthalate) multifilament yarn, (b) unwinding the yarn from the package, (c) false-twist texturing the yarn to form the textured yarn, and (d) winding the textured yarn onto a package.

In another preferred embodiment, the multifilament yarn is bulked continuous filament yarn, and the processing comprises drawing, annealing, bulking, entangling (which can be carried out in one step with bulking or in a subsequent separate step), optionally relaxing, and winding the filaments.

In another preferred embodiment, the process further comprises cutting the multifilament yarn into staple fibers.

A further embodiment is directed to preparing monofilament.

The invention is directed to the fibers (e.g., multifilament yarns, staple, monofilament) prepared by the above processes.

The invention is directed to a poly(trimethylene terephthalate) fiber comprising poly(trimethylene terephthalate) composition comprising about 0.05 to about 5 mole % tetramethylene terephthalate repeat units. In a preferred embodiment, the invention is directed to poly(trimethylene terephthalate) multifilament yarn comprising the fibers. The invention is also directed to fabric (e.g., woven, knitted, and nonwoven fabrics) and carpets from the yarn.

The invention is also directed to a poly(trimethylene terephthalate) composition comprising about 0.05 to about 5 mole % tetramethylene terephthalate units.

Other preferences are described below.

The invention enables the practitioner to increase productivity in the spinning of poly(trimethylene terephthalate) yarns, particularly partially oriented yarns, spun drawn yarns, bulked continuous filament yarns and staple fiber manufacture, by using a high spinning speed process. Surprisingly, the resultant yarns have both high elongation and higher tenacity than yarns prepared from poly(trimethylene terephthalate) without tetramethylene terephthalate repeat units or having larger amounts of tetramethylene terephthalate repeat units. The yarns are useful in preparing many products, such as textured yarns, fabrics (e.g., knitted, woven and nonwoven fabrics) and carpets. Other results are described below.

DETAILED DESCRIPTION OF THE INVENTION

A process has been developed to produce poly(trimethylene terephthalate) yarns, particularly partially oriented yarns, at high spin speeds. The advantages of the invention are obtained using a poly(trimethylene terephthalate) composition comprising poly(trimethylene terephthalate) and about 0.05 to about 5 mole % tetramethylene terephthalate repeat units.

In the absence of an indication to the contrary, a reference to "poly(trimethylene terephthalate)" ("3GT" or "PTT"), is meant to encompass homopolymers and copolymers containing at least about 70 mole % trimethylene terephthalate repeat units and poly(trimethylene terephthalate) compositions containing at least about 70 mole % or the homopolymers or copolyesters. The preferred poly(trimethylene terephthalate)s contain at least 85 mole %, more preferably at least 90 mole %, even more preferably at least 95 or at least 98 mole %, and most preferably about 100 mole %, trimethylene terephthalate repeat units.

Examples of copolymers include copolyesters made using 3 or more reactants, each having two ester forming groups. For example, a copoly(trimethylene terephthalate) can be used in which the comonomer used to make the copolyester is selected from the group consisting of linear, cyclic, and branched aliphatic dicarboxylic acids having 4–12 carbon atoms (for example butanedioic acid, pentanedioic acid, hexanedioic acid, dodecanedioic acid, and 1,4-cyclohexanedicarboxylic acid); aromatic dicarboxylic acids other than terephthalic acid and having 8–12 carbon atoms (for example isophthalic acid and 2,6-naphthalenedicarboxylic acid); linear, cyclic, and branched aliphatic diols having 2–8 carbon atoms (other than 1,3-propanediol and 1,4-butanediol, for example, ethanediol, 1,2-propanediol, 3-methyl-1,5-pentanediol, 2,2-dimethyl-1,3-propanediol, 2-methyl-1,3-propanediol, and 1,4-cyclohexanediol); and aliphatic and aromatic ether glycols having 4–10 carbon atoms (for example, hydroquinone bis(2-hydroxyethyl) ether, or a poly(ethylene ether) glycol having a molecular weight below about 460, including diethyleneether glycol). The comonomer typically is present in the copolyester at a level in the range of about 0.5 to about 15 mole %, and can be present in amounts up to 30 mole %.

The poly(trimethylene terephthalate) can contain minor amounts of other comonomers, and such comonomers are usually selected so that they do not have any significant adverse affect on properties. Such other comonomers include 5-sodium-sulfoisophthalate, for example, at a level in the range of about 0.2 to about 5 mole %. Very small amounts of trifunctional comonomers, for example trimellitic acid, can be incorporated for viscosity control.

The poly(trimethylene terephthalate) can also be an acid-dyeable polyester composition as described in U.S. patent application Ser. Nos. 09/708,209, filed Nov. 8, 2000 (corresponding to WO 01/34693) or Ser. No. 09/938,760, filed Aug. 24, 2002, both of which are incorporated herein by reference. The poly(trimethylene terephthalate)s of U.S. patent application Ser. No. 09/708,209 comprise a secondary amine or secondary amine salt in an amount effective to promote acid-dyeability of the acid dyeable and acid dyed polyester compositions. Preferably, the secondary amine unit is present in the polymer composition in an amount of at least about 0.5 mole %, more preferably at least 1 mole %. The secondary amine unit is present in the polymer composition in an amount preferably of about 15 mole % or less, more preferably about 10 mole % or less, and most preferably 5 mole % or less, based on the weight of the composition. The acid-dyeable poly(trimethylene terephthalate) compositions of U.S. patent application Ser. No. 09/938,760 comprise poly(trimethylene terephthalate) and a polymeric additive based on a tertiary amine. The polymeric additive is prepared from (i) triamine containing secondary amine or secondary amine salt unit(s) and (ii) one or more other monomer and/or polymer units. One preferred polymeric additive comprises polyamide selected from the group consisting of poly-imino-bisalkylene-terephthalamide, -isophthalamide and -1,6-naphthalamide, and salts thereof. The poly(trimethylene terephthalate) useful in this invention can also cationically dyeable or dyed composition such as those described in U.S. Pat. No. 6,312,805, granted Nov. 6, 2001, which is incorporated herein by reference, and dyed or dye-containing compositions.

The poly(trimethylene terephthalate) can be blended with up to 30 mole percent of other polymers. Examples are polyesters prepared from other diols, such as those described above. Other polymeric additives can be added to improve strength, to facilitate post extrusion processing or provide other benefits. For example, hexamethylene diamine can be added in minor amounts of about 0.5 to about 5 mole % to add strength and processability to the acid dyeable polyester compositions of the invention. Polyamides such as Nylon 6 or Nylon 6-6 can be added in minor amounts of about 0.5 to about 5 mole % to add strength and processability to the acid-dyeable polyester compositions of the invention. A nucleating agent, preferably 0.005 to 2 weight % of a mono-sodium salt of a dicarboxylic acid selected from the group consisting of monosodium terephthalate, mono sodium naphthalene dicarboxylate and mono sodium isophthalate, as a nucleating agent, can be added as described in U.S. Pat. No. 6,245,844, which is incorporated herein by reference. The preferred poly(trimethylene terephthalate)s contain at least 85 mole %, more preferably at least 90 mole %, even more preferably at least 95 or at least 98 mole %, and most preferably about 100 mole %, poly(trimethylene terephthalate) polymer.

The intrinsic viscosity of the poly(trimethylene terephthalate) of the invention is at least about 0.70 dl/g, preferably at least about 0.80 dl/g, more preferably at least about 0.90 dl/g and most preferably at least about 1.0 dl/g. The intrinsic viscosity of the polyester composition of the invention are preferably up to about 2.0 dl/g, more preferably up to 1.5 dl/g, and most preferably up to about 1.2 dl/g.

Poly(trimethylene terephthalate) and preferred manufacturing techniques for making poly(trimethylene terephthalate) are described in U.S. Pat. Nos. 5,015,789, 5,276,201, 5,284,979, 5,334,778, 5,364,984, 5,364,987, 5,391,263, 5,434,239, 5,510454, 5,504,122, 5,532,333, 5,532,404, 5,540,868, 5,633,018, 5,633,362, 5,677,415, 5,686,276, 5,710,315, 5,714,262, 5,730,913, 5,763,104, 5,774,074, 5,786,443, 5,811,496, 5,821,092, 5,830,982, 5,840,957, 5,856,423, 5,962,745, 5,990,265, 6,235,948, 6,245,844, 6,255,442, 6,277,289, 6,281,325, 6,312,805, 6,325,945, 6,331,264, 6,335,421, 6,350,895, and 6,353,062, EP 998 440, WO 00/14041, WO 01/58981, WO 01/58982, and 98/57913, H. L. Traub, "Synthese und textilchemische Eigenschaften des Poly-Trimethyleneterephthalats", Dissertation Universitat Stuttgart (1994), S. Schauhoff, "New Developments in the Production of Poly(trimethylene terephthalate) (PTT)", Man-Made Fiber Year Book (September 1996), and U.S. patent application Ser. No. 10/057,497, all of which are incorporated herein by reference. Poly(trimethylene terephthalate)s useful as the polyester of this invention are commercially available from E. I. du Pont de Nemours and Company, Wilmington, Del., under the trademark Sorona.

The invention is preferably practiced by preparing a poly(trimethylene terephthalate) composition that is a polymer blend of poly(trimethylene terephthalate) and poly (tetramethylene terephthalate) ("4GT"). The poly (tetramethylene terephthalate) is used to further improve the yarn manufacturing process.

Tetramethylene terephthalate repeat units are present in the poly(trimethylene terephthalate) composition in amount of at least about 0.05 mole %, preferably at least about 0.1 mole %, more preferably at least about 0.5 mole %, even more preferably at least about 0.6 mole %, even more preferably at least about 0.75 mole %, even more preferably at least about 0.9 mole %, even more preferably at least about 1 mole %, even more preferably greater than 1 mole %, even more preferably at least about 1 mole %, even more preferably at least about 1.5 mole %, and most preferably greater than 1.5 mole %, of poly(tetramethylene terephthalate). Tetramethylene terephthalate repeat units are present in an amount of up to about 5 mole %, preferably less than 5 mole %, more preferably up to 4.5 mole %, even more preferably less than 4 mole %, even more preferably up to about 3 mole %, even more preferably less than 3 mole %, most preferably up to about 2.5 mole %, of poly (tetramethylene terephthalate). Most preferred is about 2 mole % of poly(tetramethylene terephthalate). They can be in the form of poly(tetramethylene terephthalate) and/or poly(trimethylene terephthalate) copolyester resulting from transesterification or added.

In many instances, the polymer blend will be prepared from poly(tetramethylene terephthalate) homopolymers or polymers that only contain minor amounts of other repeat units. In that instance reference to poly(tetramethylene terephthalate) being added in amount of at least about 0.05 to about 5 mole %, with the preferences indicated above, is appropriate.

Poly(trimethylene terephthalate) and poly(tetramethylene terephthalate) can undergo transesterification under heat, so that some or all of the poly(tetramethylene terephthalate) will react with the poly(trimethylene terephthalate) to form a copolyester. Therefore, the resulting product can be described as poly(trimethylene terephthalate) copolyester containing tetramethylene terephthalate repeating units in an amount within the ranges described above (e.g., about 0.05 to about 5 mole %).

When referring to the mole percentage of a trimethylene or tetramethylene teraphthalate repeat unit, reference is to the individual repeat unit rather than blocks of repeat units.

Any commercially available poly(tetramethylene terephthalate) should be useful in this invention. Preferred poly(tetramethylene terephthalate)s have an intrinsic viscosity of about 0.6 to about 1.5 dl/g.

The poly(tetramethylene terephthalate) can also contain other repeat units, such as described above for poly (trimethylene terephthalate), as the most important factor is the total number of tetramethylene terephthalate repeat units in the composition.

The repeat unit molecular weight ratio of trimethylene terephthalate repeat units to tetramethylene terephthalate repeat units is 0.94. Therefore, the weight % of tetramethylene terephthalate repeat units can be calculated by multiplying the mole % by 0.94.

The invention can also be practiced by starting with poly(trimethylene terephthalate) copolyesters containing about 0.05 to about 5 mole % tetramethylene terephthalate units, preferably in the amounts described above with respect to poly(trimethylene terephthalate)/poly (tetramethylene terephthalate) blends.

Here, "copolyesters" is used with reference to polyesters that can have two or more components, provided that the total trimethylene terephthalate repeat units and tetramethylene terephthalate repeat units are in the ranges described herein. The copolyesters can be block or random copolyesters, and can be prepared by known condensation polymerization techniques.

In a referred embodiment, the fibers are prepared with styrene polymers as described in U.S. patent application Ser. No. 10/183,710, filed Jun. 27,2002, which is incorporated herein by reference.

By "styrene polymer" is meant polystyrene and its derivatives. Preferably the styrene polymer is selected from the group consisting of polystyrene, alkyl or aryl substituted polystyrenes and styrene multicomponent polymers. Here, "multicomponent" includes copolymers, terpolymers, tetrapolymers, etc., and blends.

More preferably the styrene polymer is selected from the group consisting of polystyrene, alkyl or aryl substituted polystyrenes prepared from α-methylstyrene, p-methoxystyrene, vinyltoluene, halostyrene and dihalostyrene (preferably chlorostyrene and dichlorostyrene), styrene-butadiene copolymers and blends, styrene-acrylonitrile copolymers and blends, styrene-acrylonitrile-butadiene terpolymers and blends, styrene-butadiene-styrene terpolymers and blends, styrene-isoprene copolymers, terpolymers and blends, and blends and mixtures thereof. Even more preferably, the styrene polymer is selected from the group consisting of polystyrene, methyl, ethyl, propyl, methoxy, ethoxy, propoxy and chloro-substituted polystyrene, or styrene-butadiene copolymer, and blends and mixtures thereof. Yet more preferably, the styrene polymer is selected from the group consisting of polystyrene, α-methyl-polystyrene, and styrene-butadiene copolymers and blends thereof. Most preferably, the styrene polymer is polystyrene.

The number average molecular weight of the styrene polymer is at least about 5,000, preferably at least 50,000, more preferably at least about 75,000, even more preferably at least about 100,000 and most preferably at least about 120,000. The number average molecular weight of the styrene polymer is preferably up to about 300,000, more preferably up to about 200,000 and most preferably up to about 150,000.

Useful polystyrenes can be isotactic, atactic, or syndiotactic, and with high molecular weight polystyrenes atactic is preferred. Styrene polymers useful in this invention are commercially available from many suppliers including Dow Chemical Co. (Midland, Mich.), BASF (Mount Olive, N.J.) and Sigma-Aldrich (Saint Louis, Mo.).

In one preferred embodiment, poly(trimethylene terephthalate), poly(tetramethylene terephthalate), and, optionally, other ingredients such as styrene polymer, are melt blended and, then, extruded and cut into pellets. ("Pellets" is used generically in this regard, and is used regardless of shape so that it is used to include products sometimes called "chips", "flakes", etc.) The pellets are then remelted and extruded into filaments. The term "mixture" is used to refer to the pellets prior to remelting and the term "blend" is used to refer to them once they have been remelted. In considering the discussion of the relative amounts of poly(trimethylene terephthalate), poly(tetramethylene terephthalate), styrene polymer and other items described herein the same percentages apply to both the mixture and blend, although it will readily be recognized that various methods of preparing filaments can entail items being added to the mixture or blend, and therefore in some facilities the percentages can vary, but the ratio of the polymers should remain the same. For convenience, reference herein will be to the amount of polymer in the blend except where the specific reference is to the mixture before remelt.

The poly(trimethylene terephthalate) composition preferably comprises at least about 70%, more preferably at least about 80%, even more preferably at least 85%, more preferably at least about 90%, most preferably at least about 95%, and in some cases even more preferably at least 98% of poly(trimethylene terephthalate) and poly(tetramethylene terephthalate), and/or the copolyester (by weight of the polymer in the poly(trimethylene terephthalate) composition). It preferably contains up to about 99.9% of poly(trimethylene terephthalate) and poly(tetramethylene terephthalate), and/or copolyester.

In one preferred embodiment, the poly(trimethylene terephthalate) composition preferably comprises at least about 0.1%, more preferably at least about 0.5%, of styrene polymer, by weight of the polymer in the poly(trimethylene terephthalate) composition. It preferably comprises up to about 10%, more preferably up to about 5%, even more preferably up to about 2%, and most preferably up to about 1.5%, of a styrene polymer, by weight of the polymer in the poly(trimethylene terephthalate) composition. In many instances, preferred is about 0.8% to about 1% styrene polymer, by weight of the polymer in the poly(trimethylene terephthalate) composition. Reference to styrene polymer means at least one styrene polymer, as two or more styrene polymers can be used, and the amount referred to is an indication of the total amount of styrene polymer(s) used in the poly(trimethylene terephthalate) composition.

Additives, including delusterants, heat stabilizers, viscosity boosters, optical brighteners, pigments, and antioxidants, can be used. $TiO_2$ or other pigments can be added, such as described in U.S. Pat. Nos. 3,671,379, 5,798,433 and 5,340,909, EP 699 700 and 847 960, and WO 00/26301, which are incorporated herein by reference.

One advantage of this invention is that additives can be added with the poly(trimethylene terephthalate), poly(tetramethylene terephthalate), copolyester, or otherwise, including using 1,3-propanediol, 1,4-butanediol or other carriers or slurries.

The poly(trimethylene terephthalate) composition can be provided by any known technique, including physical blends and melt blends. They can be blended in many different ways. For instance, they can be (a) heated and mixed simultaneously, (b) pre-mixed in a separate apparatus before heating, or (c) heated and then mixed. In one preferred embodiment, the poly(trimethylene terephthalate), poly(tetramethylene terephthalate) and, optionally, styrene polymer are melt blended and compounded. More specifically, they are mixed and heated at a temperature sufficient to form a blend, and upon cooling, the blend is formed into a shaped article, such as pellets. The mixing, heating and forming can be carried out by conventional equipment designed for that purpose such as extruders, Banbury mixers or the like. Another approach involves preparing the poly(trimethylene terephthalate) composition by transfer line injection. For suitable blending, the temperature should be above the melting points of each component but below the lowest decomposition temperature, and accordingly must be adjusted for any particular composition of poly(trimethylene terephthalate) and polystyrene. The temperature is typically in the range of about 200° C. to about 270° C., most preferably at least about 250° C. and preferably up to about 260° C., depending on the particular polystyrene composition of the invention.

By "fibers", reference is made to items recognized in the art as fibers, such as continuous filaments, monofilament, staple, etc. The fibers can be round or have other shapes, such as octalobal, delta, sunburst (also known as sol), scalloped oval, trilobal, tetra-channel (also known as quatra-channel), scalloped ribbon, ribbon, starburst, etc. They can be solid, hollow or multi-hollow. They can be used to prepare fabrics, carpets (from bulked continuous filaments and staple), and other products. Fabrics include knitted, woven and nonwoven fabrics.

The fibers may be homofibers or multiconstituent fibers. By "homofiber" reference is to fibers comprising poly(trimethylene terephthalate), poly(trimethylene terephthalate), and/or copolyester.

When styrene polymer is used, the fibers are multiconstituent or biconstituent fibers. By "multiconstituent fiber" is meant a fiber which has a continuous polymer phase and one or more discontinuous polymer phases dispersed throughout the fiber. The styrene polymer(s) form a discontinuous phase and is highly dispersed throughout the filaments. The styrene polymer can be seen to be substantially uniformly dispersed throughout the fibers. "Biconstituent" is used to refer to the case where the only polymer phases are the poly(trimethylene terephthalate) composition and styrene polymer.

When used, the styrene polymer is highly dispersed throughout the poly(trimethylene terephthalate) polymer matrix. Preferably, the dispersed styrene polymer has a mean cross-sectional size of less than about 1,000 nm, more preferably less than about 500 nm, even more preferably less than about 200 nm and most preferably less than about 100 nm, and the cross-section can be as small as about 1 nm. By "cross-sectional size", reference is made to the size when measured from a radial image of a filament, such as shown in FIG. 1 of U.S. patent application Ser. No. 10/183,710, filed Jun. 27, 2002, which is incorporated herein by reference.

Partially oriented yarns of poly(trimethylene terephthalate) are described in U.S. Pat. Nos. 6,287,688 and 6,333,106, and U.S. Patent Publication No. 2001/30378, all of which are incorporated herein by reference. The basic steps of manufacturing partially oriented yarns including spinning, interlacing and winding poly(trimethylene terephthalate) filaments are described therein. This invention can be practiced using those steps or other steps conventionally used for making partially oriented polyester yarns; however, it provides the advantage of carrying out the process at higher speeds.

Preferably, prior to spinning the composition is heated to a temperature above the melting point of each of the poly(trimethylene terephthalate), poly(tetramethylene terephthalate), and/or the copolyester, as well as the optional styrene polymer, and extruding the composition through a spinneret and at a temperature of about 235 to about 295° C., preferably at least about 250° C. and preferably up to about 290° C, most preferably up to about 270° C.

The partially oriented yarns are multifilament yarns. The yarns (also known as "bundles") preferably comprise at least about 10 and even more preferably at least about 25 filaments, and typically can contain up to about 150 or more, preferably up to about 100, more preferably up to about 80 filaments. Yarns containing 34, 48, 68 or 72 filaments are common. The yarns typically have a total denier of at least about 5, preferably at least about 20, preferably at least about 50, and up to about 1,500 or more, preferably up to about 250.

Filaments are preferably at least about 0.5 dpf, more preferably at least about 1 dpf, and up to about 10 or more dpf, more preferably up to about 7 dpf. Typical filaments are about 3 to about 7 dpf, and fine filaments are about 0.5 to about 2.5 dpf.

Spin speeds can run from about 1,800 to about 8,000 or more meters/minute (m/m), and are preferably at least about 2,000 m/m, more preferably at least about 2,500 m/m, and most preferably at least about 3,000 m/m. One advantage of this invention is that partially oriented yarns of poly(trimethylene terephthalate) can be spun on equipment previously used to spin partially oriented yarns of poly(ethylene terephthalate), so spin speeds are preferably up to about 4,000 m/m, more preferably up to about 3,500 m/m. Spinning speeds of about 3,200 m/m frequently used to spin partially oriented yarns of poly(trimethylene terephthalate) are preferred.

The invention is primarily discussed with typical about 3 to about 7 dpf filaments. Spin speeds for fine filaments are lower. For instance, poly(trimethylene terephthalate) multifilament yarns of fine filaments are presently spun at less than 2,000 m/m, whereas with the invention they can be spun at higher speeds, such as about 2,500 m/m or higher.

Partially oriented yarns are usually wound on a package, and can be used to make fabrics or further processed into other types of yarn, such as textured yarn. They can also be stored in a can prior to preparing fabrics or further processing, or can be used directly without forming a package or other storage.

Spun drawn yarn, also known as "fully drawn yarn", can also be prepared advantageously using the invention. The preferred steps of manufacturing spun drawn yarns including spinning, drawing, optionally and preferably annealing, optionally interlacing, and winding poly(trimethylene terephthalate) filaments are similar to those used for preparing poly(ethylene terephthalate) yarns.

One advantage of this invention is that the process can be carried out at higher speeds than when the polymers of this invention aren't used.

Another advantage of this invention is that spun drawn yarns can be prepared using higher draw ratios than with poly(trimethylene terephthalate) by itself. This can be done by using a lower spin speed than normal, and then drawing at previously used speeds. When carrying out this process, there are fewer breaks than previously encountered.

Preferably, prior to spinning the poly(trimethylene terephthalate) composition is heated to a temperature above the melting point of each of the poly(trimethylene terephthalate), poly(tetramethylene terephthalate) and/or copolyesters, as well as the optional styrene polymer, and extruding the composition through a spinneret and at a temperature of about 235 to about 295° C., preferably at least about 250° C. and up to about 290° C., most preferably up to about 270° C.

These yarns are also multifilament yarns. The yarns (also known as "bundles") preferably comprise at least about 10 and even more preferably at least about 25 filaments, and typically can contain up to about 150 or more, preferably up to about 100, more preferably up to about 80 filaments. Yarns containing 34, 48, 68 or 72 filaments are common. The yarns typically have a total denier of at least about 5, preferably at least about 20, preferably at least about 50, and up to about 1,500 or more, preferably up to about 250.

Filaments are preferably at least about 0.1 dpf, more preferably at least about 0.5 dpf, more preferably at least about 0.8 dpf, and up to about 10 or more dpf, more preferably up to about 5 dpf, and most preferably up to about 3 dpf.

The draw ratio is at least 1.01, preferably at least about 1.2 and more preferably at least about 1.3. The draw ratio is preferably up to about 5, more preferably up to about 3, and most preferably up to about 2.5.

Draw speeds (as measured at the roller at the end of the draw step) can run from about 2,000 or more meters/minute (m/m), and are preferably at least about 3,000 m/m, more preferably at least about 3,200 m/m, and preferably up to about 8,000 m/m, more preferably up to about 7,000 m/m.

Spun drawn yarns are usually wound on a package, and can be used to make fabrics or further processed into other types of yarn, such as textured yarn. They can also be stored in a can prior to preparing fabrics or further processing, or can be used directly without forming a package or other storage.

Textured yarns can be prepared from partially oriented yarns or spun drawn yarns. The main difference is that the partially oriented yarns usually require drawing whereas the spun drawn yarns are already drawn.

U.S. Pat. Nos. 6,287,688 and 6,333,106, and U.S. Patent Publication No. 2001/30378, all of which are incorporated herein by reference, describe the basic steps of manufacturing textured yarns from partially oriented yarns. This invention can be practiced using those steps or other steps conventionally used for making partially oriented polyester yarns. The basic steps include unwinding the yarns from a package, drawing, twisting, heat-setting, untwisting, and winding onto a package. Texturing imparts crimp by twisting, heat setting, and untwisting by the process commonly known as false twist texturing. The false-twist texturing is carefully controlled to avoid excessive yarn and filament breakage.

A preferred process for friction false-twisting described in U.S. Pat. Nos. 6,287,688 and 6,333,106, and U.S. Patent Publication No. 2001/30378 comprises heating the partially oriented yarn to a temperature between 140° C. and 220° C., twisting the yarn using a twist insertion device such that in the region between the twist insertion device and the entrance of the heater, the yarn has a twist angle of about 46° to 52° and winding the yarn on a winder.

When prepared from spun drawn yarn, the process is the same except that drawing is reduced to a very low level (e.g., draw ratio can be as low as 1.01).

These multifilament yarns (also known as "bundles") comprise the same number of filaments as the partially oriented yarns and spun drawn yarns from which they are made. Thus, they preferably comprise at least about 10 and even more preferably at least about 25 filaments, and typically can contain up to about 150 or more, preferably up to about 100, more preferably up to about 80 filaments. The yarns typically have a total denier of at least about 1, more preferably at least 20, preferably at least about 50, and up to about 1,500 or more, preferably up to about 250.

Filaments are preferably at least about 0.1 dpf, more preferably at least about 0.5 dpf, more preferably at least about 0.8 dpf, and up to about 10 or more dpf, more preferably up to about 5 dpf, and most preferably up to about 3 dpf.

When prepared from partially oriented yarn, the draw ratio is at least 1.01, preferably at least about 1.2 and more preferably at least about 1.3. The draw ratio is preferably up to about 5, more preferably up to about 3, and most preferably up to about 2.5. Draw speeds (as measured at the roller at the end of the draw step) can run from about 50 to about 1,200 or more meters/minute (m/m), and are preferably at least about 300 m/m and preferably up to about 1,000 m/m.

When prepared from spun drawn yarns, speeds (as measured at the first godet the fiber contacts) can run from about 50 to about 1,200 or more meters/minute (m/m), and are preferably at least about 300 m/m and preferably up to about 800 m/m.

Poly(trimethylene terephthalate) bulked continuous filament ("BCF") yarns and their manufacture are described in U.S. Pat. No. 5,645,782 Howell et al., U.S. Pat. No. 6,109,015 Roark et al. and U.S. Pat. No. 6,113,825 Chuah; U.S. patent application Ser. Nos. 09/895,906, 09/708,209, 09/938,760 and 10/099,373, and CH2848, respectively); and WO 99/19557, all of which are incorporated herein by reference. BCF yarns are used to prepare all types of carpets, as well as textiles. The compositions of this invention can be used to improve the spin speed of their preparation.

Preferred steps involved in preparing bulked continuous filaments include spinning (e.g., extruding, cooling and coating (spin finish) the filaments), single stage or multi-stage drawing (preferably with heated rolls, heated pin or hot fluid assist (e.g., steam or air)) at about 80 to about 200° C. and at a draw ratio of about 3 to about 5, preferably at least about 3.4 and preferably up to about 4.5, annealing at a temperature of about 120 to about 200° C., bulking, entangling (which can be carried out in one step with bulking or in a subsequent separate step) optionally relaxing, and winding the filaments on a package for subsequent use.

Bulked continuous filament yarns can be made into carpets using well known techniques. Typically, a number of yarns are cable twisted together and heat set in a device such as an autoclave, Suessen or Superba®, and then tufted into a primary backing. Latex adhesive and a secondary backing are then applied.

Another advantage of the invention is that the draw ratio does not need to be lowered due to the use of a higher spinning speed. That is, poly(trimethylene terephthalate) orientation is normally increased when spinning speed is increased. With higher orientation, the draw ratio normally needs to be reduced. With this invention, the poly (trimethylene terephthalate) orientation is lowered, so the practitioner is not required to use a lower draw ratio.

Staple fibers and products can be prepared using the processes described in U.S. patent application Ser. Nos. 09/934,904 and 09/934,905, both filed Aug. 22, 2001, and WO 01/68962, WO 01/76923, WO 02/22925 and WO 02/22927, which are incorporated herein by reference. Poly (trimethylene terephthalate) staple fibers can be prepared by melt spinning the composition (with optional styrene polymer) at a temperature of about 245 to about 285° C. into filaments, quenching the filaments, drawing the quenched filaments, crimping the drawn filaments, and cutting the filaments into staple fibers, preferably having a length of about 0.2 to about 6 inches (about 0.5 to about 15 cm).

One preferred process comprises: (a) providing a poly (trimethylene terephthalate) composition (with optional styrene polymer), (b) melt spinning the melted poly (trimethylene terephthalate) composition at a temperature of about 245 to about 285° C. into filaments, (c) quenching the filaments, (d) drawing the quenched filaments, (e) crimping the drawn filaments using a mechanical crimper at a crimp level of about 8 to about 30 crimps per inch (about 3 to about 12 crimps/cm), (f) relaxing the crimped filaments at a temperature of about 50 to about 120° C., and (g) cutting the relaxed filaments into staple fibers, preferably having a length of about 0.2 to about 6 inches (about 0.5 to about 15 cm). In one preferred embodiment of this process, the drawn filaments are annealed at about 85 to about 115° C. before crimping. Preferably, annealing is carried out under tension using heated rollers. In another preferred embodiment, the drawn filaments are not annealed before crimping.

Staple fibers are useful in preparing textile yarns and textile or nonwoven fabrics, and can also be used for fiberfill applications and making carpets.

The invention can also be used to prepare monofilaments. Preferably monofilaments are 10 to 200 dpf. Monofilaments, monofilament yarns and use thereof are described in U.S. Pat. No. 5,340,909 and EP 1 167 594, which are incorporated herein by reference. While the invention is primarily described with respect to multifilament yarns, it should be understood that the preferences described herein are applicable to monofilaments.

While it is possible to prepare more than one type of yarn using a spinneret, the invention is preferably practiced by spinning one type of filament using a spinneret.

The invention is also directed to the poly(trimethylene terephthalate) compositions described above. In addition to being useful in fibers, such compositions are also useful in other shaped articles such as films, film layers, bottles, sheets, engineering polymer components, etc.

EXAMPLES

The following examples are presented for the purpose of illustrating the invention, and are not intended to be limiting. All parts, percentages, etc., are by weight unless otherwise indicated.

Intrinsic Viscosity

The intrinsic viscosity (IV) was determined using viscosity measured with a Viscotek Forced Flow Viscometer Y900 (Viscotek Corporation, Houston, Tex.) for the poly (trimethylene terephthal ate) or poly(tetramethylene terephthalate) dissolved in 50/50 weight % trifluoroacetic acid/methylene chloride at a 0.4 grams/dL concentration at 19° C. following an automated method based on ASTM D 5225-92. These measured IV values were correlated to IV values measured manually in 60/40 weight % phenol/1,1,2, 2-tetrachloroethane following ASTM D 4603-96.

Tenacity and Elongation at Break

The physical properties of the poly(trimethylene terephthalate) yarns reported in the following examples were measured using an Instron Corp. tensile tester, model no. 1122. More specifically, elongation to break, $E_b$, and tenacity were measured according to ASTM D-2256.

Leesona Skein Shrinkage Test

The well-known Leesona Skein Shrinkage test was used to measure bulk of the textured yarns. First, the number of wraps needed was determined by using the following formula:

Number of wraps=12,500 denier/(yarn denier×2)

Then a skein was wound on a reel using the number of wraps determined from the above equation, and the circumference of the reel was measured for use in the final calculations. Then, a 20-gram weight of the skein was hung and the skein was removed from the reel. (The skein was not allowed to relax.) While the skein was still hung under the 20-gram tension, it was completely immerse in a container of water at 180° F. for 10 minutes. The skein was removed from the container of water (without removing the weight), and after two minutes the length of the skein was measured with the 20-gram weight still on. The skein shrinkage was calculated using the formula:

Percent Skein Shrinkage=(LO−LF×100)/LO, where LO=Original Length of skein (one-half circumference of the reel), and LF=Final Length with weight attached after hot treatment.

Poly(Trimethylene Terephthalate) Compositions

Poly(trimethylene terephthalate) compositions were prepared from Sorona® semi-dull poly(trimethylene terephthalate) (CP Polymer) pellets having an IV of 1.02 (available from E. I. DuPont de Nemours and Company, Wilmington, Del.) (poly(trimethylene terephthalate)) by itself (control) or with Crastin® 6129 Poly(tetramethylene terephthalate), E. I. du Pont de Nemours & Co., Wilmington, Del.

The styrene polymer was Sigma-Aldrich 43,010-2 having a Melt Index of 7.5 g/10 min (ASTM 1238, 200° C./5 kg), Softening Point of 107° C. (ASTM-D1525), Mn of 83,000 (ASTM D 5296-97).

The following procedures were used:

Procedure A.

Poly(trimethylene terephthalate) pellets were compounded with poly(tetramethylene terephthalate) and, optionally, polystyrene using a conventional screw remelting compounder with a barrel diameter of 30 millimeters (mm) and a MJM-4 screw (Werner & Pfleiderrer Corp., Ramsey, N.J.). The extrusion die was 3/16 inches (4.76 mm) in diameter with a screen filter at the die entrance.

The poly(trimethylene terephthalate) pellets were fed into the screw throat using a K-tron 5200 feeder (K-Tron International, Inc., Pitman, N.J.) with a 15 mm hollow auger and 25 mm tube. The nominal base polymer feed rate was dependent on the weight % used.

The poly(tetramethylene terephthalate) pellets and, when used, the polystyrene (PS) pellets were also fed into the screw throat using a K-tron T-20 feeder with twin P1 screws. Only one spiral feeder screw was used. A vacuum was typically applied at the extruder throat.

The barrel sections of the compounder were held at the following temperatures. The first heated barrel section was turned off. The second and third sections were set at 170° C. The remaining eleven sections were set at 200° C. The screw was set at 225 revolutions per minute ("rpm") yielding a melt temperature of 250° C. at the extrusion die.

The extrudant flowed into a water bath to solidify the compounded polymer into a monofilament. Then two sets of air knives dewatered the filament before entering a cutter that sliced the filament into 2 mm length pellets.

Procedure B.

Salt and pepper blends were prepared from poly (trimethylene terephthalate), poly(tetramethylene terephthalate) and, when used, polystyrene pellets by preparing a mixture of pellets and melting them. They were not compounded.

Procedure C.

The pellets from procedure A and B (or poly(trimethylene terephthalate) pellets in the control examples) were placed in a vacuum oven for drying for a minimum of 16 hours at 120° C. The dried pellets were removed from the oven and quickly dropped into a nitrogen blanketed supply hopper that was maintained at room temperature. The pellets were fed to a twin screw remelter at 100 grams per minute (gpm).

The barrel heating sections were set to 240° C. for zone 1, 265° C. for zones 2 to 5, 268° C. for zones 7–8. Pump block was 268° C., pack box heater was 268° C.

Example 1

Partially Oriented Yarn Preparation

Partially oriented yarns were spun using conventional spinning techniques from poly(trimethylene terephthalate) salt and pepper blends prepared according to procedures B and C, or by itself. This composition prepared using Procedures A and C was extruded through a sand filter spin pack and a 34 round hole spinneret (0.012 inch (0.3 mm) diameter and 0.022 inch (0.56 mm) capillary depth holes) maintained at 273° C. The filamentary streams leaving the spinneret were quenched with air at 21° C., converged to a bundle and spin finish applied. Forwarding rolls with a subsurface speed described in the table below delivered the yarn bundle to an interlace jet and then onto a windup running at the speed described in the table below. The spinning conditions and properties of the resultant partially oriented yarns are described in Table 1.

TABLE 1

Spinning Conditions & Partially Oriented Yarn Properties

| Sample | 4GT wt % | Spin Speed[b] | Winding Speed[c] | Denier | DPF | Ten[d] | $E_b$, % |
|---|---|---|---|---|---|---|---|
| A (control) | — | 2510 | 2500 | 152 | 4.5 | 2.12 | 104.1 |
| B (control) | — | 3010 | 3000 | 128 | 3.8 | 2.31 | 74.3 |
| C (control) | — | 3510 | 3500 | 111 | 3.3 | 2.6 | 70.5 |
| 1 | 2 | 2510 | 2500 | 150 | 4.4 | 2.24 | 116.2 |
| 2 | 2 | 3010 | 3000 | 133 | 3.9 | 2.44 | 89.7 |
| 3 | 2 | 3510 | 3500 | 112 | 3.3 | 2.61 | 72.5 |
| 4 | 5 | 2510 | 2500 | 155 | 4.6 | 2.10 | 110.5 |
| 5 | 5 | 3010 | 3000 | 131 | 3.8 | 2.4 | 85.7 |

[a]"4GT" = poly(tetramethylene terephthalate). The weight percentage is based on the weight of polymer in the blend.
[b]Spinning Godet Speed, m/m.
[c]Winding Speed, m/m.
[d]Tenacity, g/d.
[e]Elongation to Break, %.

Prior to this invention, poly(trimethylene terephthalate) partially oriented yarns had to be spun at slow speeds (ca. 2,500 m/m) to be suitable for draw-texturing operations. The data in Table 1 shows that the partially oriented yarns of this invention are suitable for draw-texturing when prepared at significantly higher spinning speeds.

The three control samples show that with increased spinning and windup speed elongation to break drops as tenacity increases. Products made at higher speeds were not sufficiently suitable for draw-texturing operations. With addition of poly(tetramethylene terephthalate), the partially oriented yarns spun at higher speeds had properties suitable for draw-texturing operations. Most notably, the yarns of this invention had higher tenacities than the control samples. This was unexpected. As a result, using the invention partially oriented yarns can be prepared at higher speeds and have higher tenacities means that they are well suited for draw-texturing or other down-stream processes, particularly when higher tenacity or yarn strength is desirable. In addition, the invention enables use of equipment designed for making poly(ethylene terephthalate) partially oriented yarns at the higher speeds it was designed for.

Example 2

Partially Oriented Yarn Preparation

Yarn was spun as described in Example 1 from the blends prepared according to procedure A to demonstrate that partially oriented yarns can be prepared with a variety of styrene polymers and under varied conditions.

TABLE 2

Spinning Conditions & Partially Oriented Yarn Properties

| Sample | 4GT* wt % | PS** (wt %) | Spinning Godet Speed, m/m | Winding Speed, m/m | Yarn Denier | DPF | Tenacity (g/d) | $E_b$, % |
|---|---|---|---|---|---|---|---|---|
| A (control) | — | — | 2500 | 2535 | 211 | 6.2 | 2.11 | 97.8 |
| B (control) | — | — | 2500 | 2530 | 212 | 6.2 | 2.25 | 106.0 |
| C (control) | — | — | 2500 | 2550 | 211 | 6.2 | 2.35 | 109.2 |
| D (control) | — | — | 3500 | 3550 | 152 | 4.5 | 3.10 | 70.7 |
| 1 | 2 | — | 3000 | 3030 | 207 | 6.1 | 2.09 | 111.7 |
| 2 | 1 | 1 | 3000 | 3030 | 202 | 5.9 | 2.45 | 98.5 |

*Crastin ® 6129 Poly(tetramethylene terephthalate), E. I. du Pont de Nemours & Co., Wilmington, DE.
**Polystyrene, as described above.

The data in Table 2 shows that improved partially oriented yarns can be prepared at higher speeds with poly(tetramethylene terephthalate) and, with poly(tetramethylene terephthalate) and styrene polymers.

Example 3

Draw-texturing

This example shows that yarns produced according to the invention are useful in subsequent draw-texturing operations.

The draw-texturing conditions use a friction false-twist texturing process using an apparatus described in FIG. 5 of U.S. Pat. No. 6,287,688, which is incorporated herein by reference. Partially oriented yarns prepared as described in Example 2 were heated to a temperature of about 180° C. as they passed through the heater and cooled to a temperature below the glass transition temperature of poly(trimethylene terephthalate) as they passed over the cooling plate. Take-up speed was 500 m/m.

The remaining draw-texturing process conditions and the properties of the resulting draw-textured poly(trimethylene terephthalate) yarn are set forth in Table 4 below. In this Table, the draw ratio is given as the ratio of the speed of the draw roll to the speed of the feed roll.

TABLE 3

Texturing

| Sample | 4GT wt % | PS wt % | Draw Ratio | Yarn Denier | DPF | Tenacity g/d | $E_B$, % | Leesona Shrinkage |
|---|---|---|---|---|---|---|---|---|
| A (Control) | — | — | 1.35 | 163 | 4.8 | 2.68 | 43.0 | 47.6 |
| B (Control) | — | — | 1.44 | 160 | 4.7 | 2.77 | 42.7 | 42.0 |
| 1 | 2 | — | 1.33 | 164 | 4.8 | 2.68 | 45.7 | 44.4 |
| 2 | 1 | 1 | 1.29 | 171 | 5.0 | 2.28 | 40.0 | 46.6 |

The data in Table 3 shows that textured yarns prepared from the partially oriented yarns prepared according to the invention have properties comparable to poly(trimethylene terephthalate) yarns prepared from the control samples. This data shows that it is possible to prepare textured yarns from the partially oriented yarns of this invention under similar conditions to those used with poly(trimethylene terephthalate) partially oriented yarns spun at lower speeds.

Example 4

Spun Drawn Yarn

Spun drawn yarns were prepared from poly(trimethylene terephthalate) ("3GT")/poly(tetramethylene terephthalate) ("4GT") pellet blends in a spinning unit and the results are summarized in the following table.

TABLE 4

Spun Drawn Yarn

| Polymer Composition | | Extruder Temp., °C. | | | |
|---|---|---|---|---|---|
| 3GT (mole %) | 4GT (mole %) | Zone 1 | Zone 2 | Draw Ratio | Comments |
| 100 | 0 | 255 | 265 | 4 | Collected yarns for 5 minutes. No filament breaks. |
| 100 | 0 | 255 | 265 | 5 | Did not run well. Filament breaks occurred. |
| 95.3 | 4.7 | 255 | 265 | 5 | Collected yarns for 5 minutes. No filament breaks. |

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the disclosure.

What is claimed is:

1. A process for preparing poly(trimethylene terephthalate) fibers comprising (a) providing a poly(trimethylene terephthalate) composition comprising about 0.05 to about 5 mole % tetramethylene terephthalate repeat units and (b) spinning the polymer composition to form fibers.

2. The process of claim 1 wherein the poly(trimethylene terephthalate) composition comprises about 95 to about 99.95 mole % of the trimethylene terephthalate units and about 5 to about 0.05 mole % of the tetramethylene terephthalate repeat units.

3. The process of claim 1 wherein the poly(trimethylene terephthalate) composition comprises about 70 to about 99.95 mole % of the poly(trimethylene terephthalate), about 5 to about 0.05 mole % of the tetramethylene terephthalate repeat units, and, optionally, up to 29.95 mole % of other polymeric units.

4. The process of claim 1 wherein the poly(trimethylene terephthalate) composition comprises about 0.5 to about 3 mole % tetramethylene terephthalate repeat units.

5. The process of claim 1 wherein the poly(trimethylene terephthalate) composition comprises about 1 to about 2.5 mole % tetramethylene terephthalate repeat units.

6. The process of claim 1 wherein the poly(trimethylene terephthalate) composition comprises about 1.5 to about 2.5 mole % tetramethylene terephthalate repeat units.

7. The process of claim 1 wherein the poly(trimethylene terephthalate) composition comprises about 97.5 to about 99 mole % of poly(trimethylene terephthalate) and about 2.5 to about 1 mole % of poly(tetramethylene terephthalate).

8. The process of claim 1 wherein the poly(trimethylene terephthalate) composition comprises about 97.5 to about 98.5 mole % of poly(trimethylene terephthalate) and about 2.5 to about 1.5 mole % of poly(tetramethylene terephthalate).

9. The process of claim 1 wherein the poly(trimethylene terephthalate) composition comprises a poly(trimethylene terephthalate) copolyester containing about 1.5 to about 2.5 mole % tetramethylene terephthalate repeat units.

10. The process of claim 1 wherein the poly(trimethylene terephthalate) composition further comprises styrene polymer.

11. The process of claim 10 when the styrene polymer is selected from the group consisting of polystyrene, alkyl or aryl substituted polystyrenes and styrene multicomponent polymers.

12. The process of claim 10 wherein the styrene polymer is polystyrene.

13. The process of claim 1 wherein the poly(trimethylene terephthalate) composition further comprises at least one selected from the group consisting of hexamethylene diamine, polyamides, delusterants, nucleating agents, heat stabilizers, viscosity boosters, optical brighteners, pigments, and antioxidants.

14. The process of claim 1 wherein the fibers are in the form of multifilament yarn.

15. The process of claim 14 wherein the multifilament yarn is partially oriented yarn and the spinning comprises extruding the poly(trimethylene terephthalate) composition through a spinneret at a spinning speed of at least about 3,000 m/m.

16. A process for preparing poly(trimethylene terephthalate) multifilament textured yarn comprising poly(trimethylene terephthalate) multiconstituent filaments, comprising (a) preparing a package of partially oriented poly(trimethylene terephthalate) multifilament yarn by the process of claim 15, (b) unwinding the yarn from the package, (c) drawing the multiconstituent filaments yarn to form a drawn yarn, (d) false-twist texturing the drawn yarn to form the textured yarn, and (e) winding the yarn onto a package.

17. The process of claim 14 wherein the multifilament yarn is partially oriented yarn comprised of about 0.5 to about 2.5 dpf filaments and is spun at a spinning speed of at least about 2,500 m/m.

18. The process of claim 14 wherein the multifilament yarn is spun drawn yarn and the processing comprises drawing the filaments at a draw speed, as measured at the roller at the end of the draw step, of about 2,000 to about 8,000 meters/minute.

19. A process for preparing poly(trimethylene terephthalate) multifilament textured yarn comprising poly(trimethylene terephthalate) multiconstituent filaments, comprising (a) preparing a package of spun drawn poly(trimethylene terephthalate) multifilament yarn by the process of claim 18, (b) unwinding the yarn from the package, (c) false-twist texturing the yarn to form the textured yarn, and (d) winding the textured yarn onto a package.

20. The process of claim 14 wherein the multifilament yarn is bulked continuous filament yarn, and the processing comprises drawing, annealing, bulking, entangling (which can be carried out in one step with bulking or in a subsequent separate step), optionally relaxing, and winding the filaments.

21. A poly(trimethylene terephthalate) fiber comprising poly(trimethylene terephthalate) composition comprising about 0.05 to about 5 mole % tetramethylene terephthalate repeat units.

22. A poly(trimethylene terephthalate) multifilament yarn comprising fibers as claimed in claim 21.

23. A fabric comprising the yarn of claim 22.

24. A carpet made from the yarn of claim 22.

25. A poly(trimethylene terephthalate) composition comprising about 0.05 to about 5 mole % tetramethylene terephthalate repeat units.

26. The poly(trimethylene terephthalate) composition of claim 25 comprising about 1.5 to about 3 mole % tetramethylene terephthalate repeat units.

* * * * *